Dec. 22, 1959   J. S. GOLIGHTLY   2,917,872
APPARATUS FOR BENDING GLASS
Filed Nov. 14, 1955
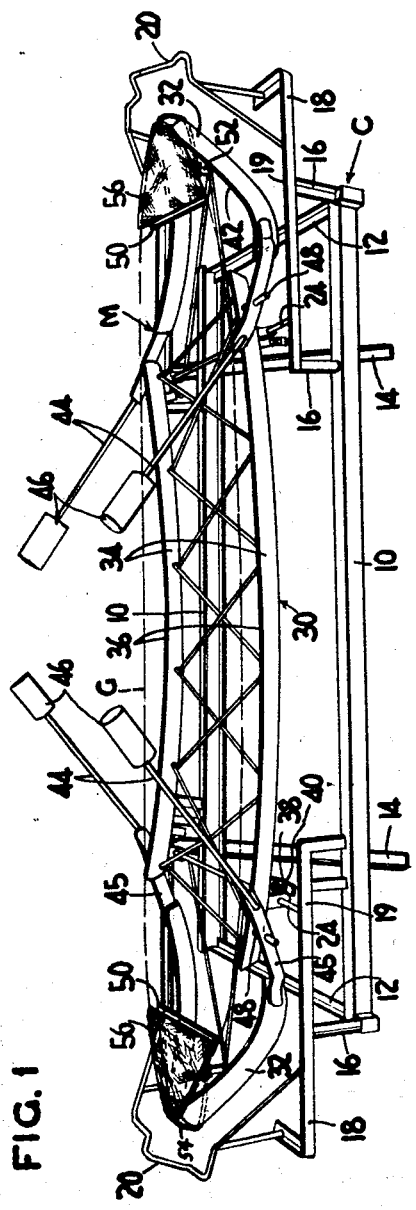
INVENTOR.
JAMES S. GOLIGHTLY
BY Oscar L. Spencer
ATTORNEY

United States Patent Office 2,917,872
Patented Dec. 22, 1959

2,917,872

APPARATUS FOR BENDING GLASS

James Sidney Golightly, Fox Chapel, Pa., assignor to Pittsburgh Plate Glass Company, Allegheny County, Pa., a corporation of Pennsylvania Application November 14, 1955, Serial No. 546,370

5 Claims. (Cl. 49—67)

The present application relates to improved apparatus for bending glass. In particular, the present application relates to apparatus for bending glass to wrap-around shapes particularly suitable for vehicle glazing wherein the glass is bent into a curvature having a relatively gently bent central region merging into spaced, sharply bent regions to form relatively flat longitudinal extremities extending in spaced substantially parallel planes substantially perpendicular to the main body of the sheet.

In bending glass sheets, the glass is mounted on sectionalized bending molds and conveyed transversely through a bending lehr provided with a bending section which includes a number of heating elements heated to various elevated temperatures to impart different intensities of heat to different regions of the glass passing therethrough. In particular, for a wrap-around bend, the central portion of the bending zone contains heaters that impart radiant heat at a relatively moderate intensity to the central region of the glass, and at each extremity of this moderate heat zone and in alignment with spaced, critical regions of the glass to be bent most severely are zones imparting relatively intense heat. The sheets, while heated to temperatures at or above the softening point for glass, sag to conform to the upper shaping surface of the molds which carry them through the bending lehr. The extremities of the glass sheets are passed through zones outboard of the zones intensely heated.

Considerable difficulty is encountered in bending glass sheets to shapes involving such variations in the severity of curvature. Since automobile designers require that the critical, severely bent regions of automotive windshields be adjacent the relatively flat windshield extremities, it is necessary to expose these critical regions to be bent severely to elevated temperatures. Such exposure of the critical regions causes the adjacent longitudinal extremities to be subjected to glass softening temperatures also, thereby sagging the extremities into a shape other than the flap shape desired.

Attempts to eliminate the sagging of the glass sheet extremities while permitting the central and critical regions to bend by selective shielding of the glass extremities following the general teaching of the use of heat shields contained in Pearse et al. Patent 2,450,297, Paddock et al. Patent 2,452,488 and Bamford et al. Patent 2,646,647 introduced a new problem that the present invention overcomes. The partially shielded glass sheets are subject to thermal shock in the zones of demarcation between the shielded and unshielded regions when shields of the patented art are employed. Also, stresses are established internally of the glass because of the steep thermal gradient existing between the shielded and unshielded regions. Such stresses are difficult to remove during the annealing which follows the bending operation and are reflected in zones of optical distortion in the final product.

The present invention inhibits overbending of the glass extremities and minmizes stresses and optical distortion caused by steep thermal gradients between the shielded and unshielded glass regions by utilizing thermal shields for preselected areas of the glass in a novel manner. According to the present invention, thermal shields are used to cover a preselected region or regions of the glass sheets to be maintained flat. As the bending progresses, the shielded region is diminished gradually in synchronism with the progress of the bending cycle until the entire sheet is exposed directly to the radiant heaters in the bending lehr. Annealing is started before the flat regions are sagged appreciably by heat exposure.

Broadly speaking, the present invention provides a glass bending mold having an upper shaping surface, means for mounting a flat glass sheet above said upper shaping surface, shielding means movable in one position to shield a region of a glass sheet mounted above said shaping surface and into another position wherein said region is exposed, and means for moving said shielding means gradually from said one position to said other position in synchronism with the sagging of the glass sheet into conformity with the upper shaping surface upon exposing the glass laden mold to glass softening temperature. The bending mold is sectionalized to have molding members relatively movable into one position to support a flat glass sheet for bending and into another position to provide a substantially continuous frame conforming to the shape desired for the bent glass sheet and the shielding means is capable of overlying at least a portion of a molding member when the latter is in its one position and includes attaching means constructed in such a manner that it causes progressive withdrawal of the shielding means from the shielded portion of the molding member as the latter moves from said one position to said other position.

In a particular embodiment of the present invention used with a bending mold having a fixed center molding member and rotatable end members, a fabric cloth of a flexible, refractory material that does not mar the glass upon sliding thereon at elevated temperatures is fixed to a portion of the sectionalized mold that remains stationary relative to a mold support carriage. The end members are rotated into a spread position and flat glass mounted on the spread mold. The glass extremities are covered with the fabric cloth. As the end members move from a spread position to a closed mold position providing a substantially continuous mold shaping surface conforming in elevation and outline to the shape desired for the bent glass sheet, the rotation of the end members relative to the fixed mold structure causes the fabric to be displaced progressively from the glass area initially covered. Finally, the entire glass sheet becomes exposed in the last stages of the bending cycle. The sheet must be annealed before the glass extremities commence to sag in response to their continued exposure to glass bending temperatures.

A primary object of the present invention is to provide apparatus for bending glass to complex shapes including a region where the glass is to be bent and a region adjacent said bent region to be kept relatively flat.

Another object of the present invention is to provide a sectionalized mold with a shield capable of covering a preselected region of flat glass and removable from shielding relation thereto as the glass bending operation progresses.

Still another object of the present invention is to provide apparatus for bending elongated flat glass sheets to complex curvatures including relatively gently bent central regions flanked by relatively sharply bent intermediate regions and relatively flat extremities.

These and other objects of the present invention will become apparent upon studying a description of a particular embodiment of my invention which is disclosed for purposes of illustration rather than limitation. The latter criterion may be determined by reference to the claims appended to this disclosure.

In the drawings forming part of the present disclosure,

Figure 1 represents a perspective view of a typical sectionalized mold improved according to my invention, with the mold shown in its open position loaded with flat glass prior to bending.

Figure 2 is a view of the mold similar to Figure 1 showing the bending mold after the bend has been completed.

Figure 3 is a fragmentary sectional elevation showing how my invention is utilized in loading a glass sheet bending mold.

Referring to the drawings wherein like reference characters are applied to similar structures, a support carriage C is shown carrying a mold depicted generally as M for supporting a glass sheet G to be bent.

Carriage C comprises a pair of spaced longitudinal L beams 10 interconnected by cross beams 12 at their longitudinal extremities. A pair of rails 14 also interconnect the longitudinal beams 10 beneath the latter and intermediate cross beams 12 to provide a sliding support for moving the carriage along a roll conveyor in a bending lehr. The carriage also comprises vertical pillars 16 which support a superstructure 18 above the longitudinal L beams 10. Superstructure 18 includes pairs of opposed notched beams 19 for supporting mold support rods, and handles 20 at its outboard extremities to facilitate handling and storage of the carriages.

The superstructure 18 is mounted at either longitudinal extremity of the carriage C. The opposed beams 19 are notched at 22. When the carriage is supporting mold M, the notches 22 carry support rods 24 to which the molds are attached.

Molds M comprise a center molding member 30 and end molding members 32. The center molding member comprises a pair of spaced longitudinally extending rails 34 each provided with upper shaping surfaces 36 conforming in elevation and outline to the contour desired for the opposed center portions of the margin of the bent glass sheet. Each rail 34 is connected at its under surface and adjacent each of its longitudinal extremities to a mold support bar 24 by means of a lug 38. Stop members 40 are also attached to the under surface of the rails 34 adjacent each lug 38. Thus, center molding member 30 is held in fixed relationship to the carriage C by means of the fixed support of the mold support bars 24 on the notches 22 of the opposed mold support beams 19 of the carriage C.

The end molding members 32 are provided with upper shaping surfaces 42. The end members are of a modified U-shape contour so as to provide at their shaping surface a configuration conforming in elevation and outline to the shape desired for the extremities of the glass sheet to be bent.

Counterweighted arms 44 are attached to the inboard extremities of the end molding members 32 through connector bars 45. Counterweights 46 are secured to the inboard extremities of the counterweighted arms 44. The end members 32 are pivotable about hinge rods 48. The disposition of the counterweights is such as to urge the end members 32 to rotate into a closed mold position. In this position, the upper shaping surfaces 36 of rails 34 and upper shaping surfaces 42 of the end members 32 provide a substantially continuous surface conforming in elevation and outline to the shape desired for the margin of the bent glass.

The mold also includes a pair of heat abstractor plates 50 attached by means of a support 52 to each mold support bar 24. A cord 54 is woven at one end to a flexible, refractory, fabric pad 56 at one end and tied to the support 52 at its other end. Pad 56 is preferably composed of a material that does not mar the surface of a glass sheet when it is slid relative thereto at elevated temperatures. For the purpose of this application, the term "elevated temperatures" is defined as one that is substantially above room temperature and approaches or exceeds glass softening temperatures. Fiber glass and asbestos cloth are examples of suitable materials for the fabric pads 56.

When glass is mounted on the bending mold for bending, the end members 32 are rotated in a direction opposite the moments supplied by the counterweights 46 and flat glass is supported at the outboard longitudinal extremities of the wing members 32 and the rails 34. After the glass has been mounted on the mold, the fabric sheets 56 are lapped over the longitudinal extremities of the glass sheet. As the mold M and the carriage C are conveyed through a bending lehr, the glass softens from the applied heat and the end members 32 are rotated by the counterweights 46. As the end members 32 rotate, they force the extremities of the glass upwardly.

The extremities of the glass which were shielded from the heat of the overhead lehr heaters by lapping the fabric pads above their upper surfaces, are gradually exposed by increments in outboard directions as the limited length of the woven cords 54 causes the pads 56 to slide along the upper glass surfaces. This gradual increase in exposed area inhibits any thermal shock which is present with glass shielded throughout the entire bending cycle as disclosed in the present patented art.

By the time the glass has been bent to the final desired position, such as depicted in Figure 2, the fabric sheets 56 have been displaced completely from their shielding position on the upper surface of the glass. The engagement of the connector bars 45 with stop members 40 prevents overbending of the glass.

The provision of shields that are movable relative to the glass such as disclosed herein has resulted in improved quality of glass. Not only are the tips maintained in close intimate contact to the longitudinal extremities of the end members 32, but also fractures due to thermal shock caused by steep thermal gradients within the glass are minimized by virtue of the gradual increase in the area of the glass exposed to the bending lehr heaters. Less optical distortion is present in the final product compared to products formed by prior art apparatus utilizing fixed shields or shields whose movement is not synchronized with the bending cycle in the manner taught by the present invention.

While the present invention has been illustrated by reference to a sectionalized, skeleton mold having a generally concave upper shaping surface, its principles are equally suitable for use with either solid or sectionalized molds. Also the shaping surfaces of the mold equipped according to my invention may be either concave or convex in elevation.

The shields need not touch the surface of the glass sheet as long as they are interposed between the source of heat and a portion of the glass sheet. The present invention requires that the shields be movable relative to the mold as the bending cycle progresses in such a manner that the area of glass exposed directly to the heating elements of the bending lehr is increased gradually, thereby eliminating a fixed straight or serrated line of demarcation between the shielded and unshielded portions of the glass, which is inherent in the prior art bending techniques utilizing shielding. However, the closer the shields are located to the glass sheet, the better is the resulting shielding action.

Hence, it is preferable, though not mandatory, that the movable shields be of the flexible, refractory material than can slide relative to the glass at elevated temperatures without marring the glass surface, thus shielding the extremities efficiently, but allowing the areas shielded to be decreased gradually in synchronism with the progress of the bending cycle, an accomplishment never attained previously. In the particular embodiment illustrated, the shielding pads slide longitudinally of the mold to expose the glass extremities gradually. However, the shields mounted on the molds may also be moved transversely of the glass to cause a transverse bend of varying degree within the broadest scope of the present invention.

What is claimed is:

1. In apparatus for bending glass comprising a sectionalized bending mold having molding members relatively movable into one position to support a flat glass sheet for bending and into another position to provide a substantially continuous frame conforming in elevation and outline to the shape desired for the margin of the bent glass sheet, and a support for said hold, the improvement comprising attaching means having a free end and a fixed end, its fixed end being in fixed relation to said support, and shielding means fixed to its free end and capable of overlying at least a portion of a molding member when the latter is in its one position, the length of said attaching means being fixed so that it causes progressive withdrawal of the shielding means from the shielded portion of the molding member as the latter moves from said one position to said another position.

2. The improvement according to claim 1, wherein the shielding means is composed of a fabric of flexible, refractory material that does not mar the glass surface when slid thereon at elevated temperatures.

3. In apparatus for bending glass comprising a sectionalized bending mold comprising a fixed center section having an upper shaping surface and a relatively gentle curvature, rotatable end members having upper shaping surfaces that define a relatively sharp curvature adjacent their inboard extremities and a relatively flat shape at their outboard extremities, said end members being rotatable into one position to support a flat glass sheet for bending and into another position to provide with the center section a substantially continuous frame conforming in elevation and outline to the shape desired for the margin of the bent glass sheet, the improvement comprising attaching means having a fixed end and a free end, its fixed end being in fixed relation to said fixed center section, shielding means fixed to said free end and capable of overlying at least a portion of an end molding member when the latter is in its one position, the length of said attaching means being fixed so that it causes progressive withdrawal of the shielding means from the shielded portion of the end molding member as the latter moves from said one position to said another position.

4. The improvement according to claim 3, wherein the shielding means is composed of a fabric of flexible, refractory material that does not mar the glass surface when slid thereon at elevated temperatures.

5. Apparatus for bending glass comprising a bending mold including a structural element and a plurality of molding members comprising a first molding member fixed in position relative to said structural element and a second molding member movable into one position relative to said structural element to help support a flat glass sheet for bending and into another position relative to said structural element to cooperate with said first molding member to help form a continuous shaping surface conforming to the shape desired for the bent glass sheet, connecting means having one end attached to said structural element, and shielding means attached to its other end and capable of overlying at least a portion of the second molding member when the latter is in its one position, the length of said connecting means being fixed so that it causes progressive withdrawal of the shielding means from a position overlying the shielded portion of said second molding member as the latter moves from said one position to said other position relative to said structural element.

References Cited in the file of this patent

UNITED STATES PATENTS

| | | |
|---|---|---|
| 2,348,278 | Boyles et al. | May 9, 1944 |
| 2,450,297 | Pearse et al. | Sept. 28, 1948 |
| 2,452,488 | Paddock et al. | Oct. 26, 1948 |
| 2,526,359 | Jendrisak | Oct. 17, 1950 |
| 2,646,647 | Bamford et al. | July 28, 1953 |

FOREIGN PATENTS

| | | |
|---|---|---|
| 710,393 | Great Britain | June 9, 1954 |

UNITED STATES PATENT OFFICE
CERTIFICATE OF CORRECTION

Patent No. 2,917,872                         December 22, 1959

James Sidney Golightly

It is hereby certified that error appears in the printed specification of the above numbered patent requiring correction and that the said Letters Patent should read as corrected below.

Column 1, line 52, for "flap shape desired" read -- flat shape desired --; column 5, line 12, for "for said hold" read -- for said mold --.

Signed and sealed this 11th day of October 1960.

(SEAL)
Attest:

KARL H. AXLINE                              ROBERT C. WATSON
Attesting Officer                          Commissioner of Patents